(12) United States Patent
Shao et al.

(10) Patent No.: US 11,994,844 B2
(45) Date of Patent: May 28, 2024

(54) INDUSTRIAL INTERNET OF THINGS SYSTEMS FOR PRODUCTION LINES WHEN DEFECTIVE PRODUCTS ARE PRODUCED, REGULATION METHODS, AND STORAGE MEDIUM THEREOF

(71) Applicant: CHENGDU QINCHUAN IOT TECHNOLOGY CO., LTD., Sichuan (CN)

(72) Inventors: Zehua Shao, Chengdu (CN); Haitang Xiang, Chengdu (CN); Yaqiang Quan, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/337,551

(22) Filed: Jun. 20, 2023

(65) Prior Publication Data
US 2023/0333542 A1    Oct. 19, 2023

(30) Foreign Application Priority Data
Feb. 2, 2023   (CN) .......................... 202310051180.5

(51) Int. Cl.
G05B 19/418        (2006.01)
(52) U.S. Cl.
CPC ... G05B 19/4185 (2013.01); G05B 19/41875 (2013.01)
(58) Field of Classification Search
None
See application file for complete search history.

(56) References Cited

U.S. PATENT DOCUMENTS 9,729,639 B2 * 8/2017 Sustaeta ................. H04L 67/125
11,138,570 B1 * 10/2021 Leise ...................... G01M 17/00
(Continued)

FOREIGN PATENT DOCUMENTS

| CN | 102566447 A | 7/2012 |
| CN | 106649907 A | 5/2017 |

(Continued)

OTHER PUBLICATIONS

First Office Action in Chinese Application No. 202310051180.5 dated Mar. 23, 2023, 16 pages.
(Continued)

*Primary Examiner* — Jason Lin
(74) *Attorney, Agent, or Firm* — Runzhi Lai

(57) ABSTRACT

Embodiments of the present disclosure provide an Industrial Internet of Things system for a production line when a defective product is produced, a regulation method, and a storage medium. The regulation method includes: a management platform sending quality testing information in the perception information sent by an object platform to a service platform; the service platform comparing a count of defective products with a first count threshold of defective products preset by each process and generating an instruction for retrieving process information when the count exceeds the first count threshold; the management platform receiving the instruction and sending object platform configuration information and latest-stored operation information to the service platform; the service platform performing a parameter comparison with a same parameter name and generating a parameter configuration instruction; the object platform receiving the instruction and performing configuration, performing the parameter comparison again, and feeding a comparison result back.

5 Claims, 5 Drawing Sheets

(56) References Cited

U.S. PATENT DOCUMENTS

| | | | |
|---|---|---|---|
| 11,256,243 B2* | 2/2022 | Cella | G06N 3/088 |
| 2004/0122625 A1* | 6/2004 | Nasser | G05B 23/0218 |
| | | | 702/185 |
| 2007/0271361 A1* | 11/2007 | Abzarian | H04L 63/0227 |
| | | | 709/223 |
| 2008/0128642 A1* | 6/2008 | Mos | G03F 7/70458 |
| | | | 250/492.22 |
| 2008/0294281 A1* | 11/2008 | Shimshi | G06Q 50/04 |
| | | | 700/110 |
| 2010/0174772 A1* | 7/2010 | Beck | G06F 21/6218 |
| | | | 718/100 |
| 2011/0061015 A1* | 3/2011 | Drees | H02J 13/00016 |
| | | | 700/275 |
| 2011/0224918 A1* | 9/2011 | Floeder | G01N 21/8922 |
| | | | 702/35 |
| 2015/0074259 A1* | 3/2015 | Ansari | H04M 15/31 |
| | | | 709/224 |
| 2017/0006135 A1* | 1/2017 | Siebel | G06Q 10/06 |
| 2018/0189939 A1* | 7/2018 | Ghidotti Piovan | G06T 7/136 |
| 2019/0273784 A1* | 9/2019 | Shao | H04W 84/04 |
| 2020/0150628 A1* | 5/2020 | Vance | G05B 23/0275 |
| 2022/0187847 A1* | 6/2022 | Cella | G05B 19/41885 |

FOREIGN PATENT DOCUMENTS

| | | |
|---|---|---|
| CN | 109741927 A | 5/2019 |
| CN | 110263978 A | 9/2019 |
| CN | 111103859 A | 5/2020 |
| CN | 111580480 A | 8/2020 |
| CN | 212120876 U | 12/2020 |
| CN | 114022059 A | 2/2022 |
| CN | 114326641 A | 4/2022 |
| CN | 114625097 A | 6/2022 |
| CN | 114661000 A | 6/2022 |
| CN | 115034347 A | 9/2022 |
| CN | 115204739 A | 10/2022 |
| CN | 115208927 A | 10/2022 |
| JP | 2003029825 A | 1/2003 |
| JP | 2003127036 A | 5/2003 |
| JP | 2006195903 A | 7/2006 |
| JP | 2019061598 A | 4/2019 |

OTHER PUBLICATIONS

Notification to Grant Patent Right for Invention in Chinese Application No. 202310051180.5 dated Mar. 30, 2023, 2 pages.

Shao Zehua et al., Sensing and Control of Abnormal Gas State of Intelligent Gas Meter Based on Internet of Things, Gas & Heat, 40(3), 2020, 5 pages.

Zhu, Zhiyuan et al., A Multi-objective Dynamic Rebalancing Scheduling Algorithm for Mixed-model Assembly line, Information Science and Service Science and Data Mining (ISSDM), 2012 6th International Conference on New Trends in Information Science, 586-591, 2013.

* cited by examiner

INDUSTRIAL INTERNET OF THINGS SYSTEMS FOR PRODUCTION LINES WHEN DEFECTIVE PRODUCTS ARE PRODUCED, REGULATION METHODS, AND STORAGE MEDIUM THEREOF

CROSS-REFERENCE TO RELATED APPLICATIONS

The application claims priority of Chinese Patent Application No. 202310051180.5, filed on Feb. 2, 2023, the entire contents of which are incorporated herein by reference.

TECHNICAL FIELD

The present disclosure relates to smart manufacturing technology, and in particular, to an Industrial Internet of Things system for a production line when a defective product is produced, a regulation method, and a storage medium.

BACKGROUND

With the development of digital computing and communication technology, smart manufacturing technology with informatization and automation technology as a core is gradually applied to a manufacturing industry and improves processing approaches of the manufacturing industry. The manufacturing industry may produce defective products in the process of producing and manufacturing products. The existing manufacturing industry based on smart manufacturing technology cannot completely avoid the production of defective products. If finished products are processed directly without eliminating the defective products, it will affect the quality of the product and the external evaluation of the product quality. Therefore, testing products and eliminating defective products have become indispensable processes in the manufacturing industry. At present, defective products are handled by configuring defective collection areas in each process at the production site. When a defective product is detected, it is identified as a defective product and moved to the defective collection area, and then the defective product in the defective collection area is scrapped or overhauled. The processes include cutting, stretching, cleaning, grinding, machine welding, spraying, frosting, assembly, and packaging, and the production line is equipped with different processes according to different manufactured products. The regulation of defective products in existing technology focuses on the detection of defective products and the treatment of produced defective products, yet the production line is not equipped with self-inspection and self-correction measures for defective products, and it is determined subjectively by a staff whether to correct the production line after the occurrence of defective products, so production costs and production progress cannot be effectively controlled.

Therefore, it is hoped to provide an Industrial Internet of Things system for a production line when a defective product is produced, a regulation method, and a storage medium, so as to reduce the probability of defective products in the subsequent processing process, thereby saving the production costs and reducing the impact of device factors on production progress.

SUMMARY

One or more embodiments of the present disclosure provide an Industrial Internet of Things system for a production line when a defective product is produced. The Industrial Internet of Things system includes: a perception module and a processing module; the perception module configured to perceive perception information of a plurality of devices on the production line; and the processing module configured to issue a corresponding processing instruction based on the perception information.

One or more embodiments of the present disclosure provide a regulation method for an Industrial Internet of Things system for a production line when a defective product is produced. The Industrial Internet of Things system includes: a perception module and a processing module. The perception module is configured to perceive perception information of a plurality of devices on the production line; and the processing module is configured to issue a corresponding processing instruction based on the perception information. The Industrial Internet of Things system includes a user platform, a service platform, a management platform, a sensor network platform, and an object platform that interact in turn, wherein the object platform includes a production line device configured to perform production and a quality testing device to perform quality testing in each process on the production line, the perception module is executed by the object platform and the sensor network platform, the processing module is executed by the service platform, the management platform, and the user platform. The regulation method includes: the object platform configured to send perception information within a set time period to the management platform through the sensor network platform according to a set time interval; the perception information including production line device operation information, quality testing device operation information, and quality testing information tested by the quality testing device; the management platform configured to receive, process, and store the perception information, and send the quality testing information to the service platform; the service platform configured to receive the quality testing information, obtain a count of defective products of the each process corresponding to the set time period according to quality testing information of the each process, and compare the count of defective products of the each process with a first count threshold of defective products set by the each process; when the count of defective products exceeds the first count threshold of defective products set by a process, the service platform is configured to generate an instruction for retrieving process information of the process, and send the instruction for retrieving process information to the management platform; the management platform configured to receive the instruction for retrieving process information, send pre-stored production line device configuration information and quality testing device configuration information of the process corresponding to the instruction for retrieving process information to the service platform, and send latest-stored first production line device operation information and first quality testing device operation information of the process corresponding to the instruction for retrieving process information to the service platform; the service platform configured to perform a parameter comparison with a same parameter name between the first production line device operation information and the production line device configuration information and a parameter comparison with a same parameter name between the first quality testing device operation information and the quality testing device configuration information; if all parameter data with the same parameter name is consistent, generate configuration data normal information and feed the configuration data normal information back to the user platform for display;

and if the parameter data with the same parameter name is inconsistent, generate a parameter configuration instruction corresponding to the process and send the parameter configuration instruction to a corresponding object platform through the management platform and the sensor network platform in turn; the corresponding object platform configured to obtain second production line device operation information and second quality testing device operation information after receiving the parameter configuration instruction and performing configuration, and send the second production line device operation information and the second quality testing device operation information to the service platform through the sensor network platform and the management platform in turn; and the service platform configured to perform a parameter comparison with a same parameter name between the second production line device operation information and the production line device configuration information and a parameter comparison with a same parameter name between the second quality testing device operation information and the quality testing device configuration information, generate check comparison consistent information or check comparison inconsistent information according to a comparison result, and feed the check comparison consistent information or the check comparison consistent information back to the user platform for display.

One or more embodiments of the present disclosure provide a non-transitory computer-readable storage medium storing computer instructions. When reading the computer instructions, a computer executes the regulation method.

The purpose of the present disclosure is to solve the problem that a production line in the current manufacturing industry lacks self-inspection and self-correction measures when a defective product is produced, which leads to inefficient regulation of production costs and production progress, and a regulation method for an Industrial Internet of Things system for a production line when a defective product is produced. The regulation method can detect a production line when a count of defective products exceeds a set threshold and correct configuration problems that lead to the defective product when applied, so as to reduce the probability of defective products in the subsequent processing process, thereby saving production costs and reducing the impact of device factors on the production progress.

Compared with the prior art, the present disclosure has the following beneficial effects.

(1) the object platform sends perception information to the management platform, the management platform stores and manages the perception information, sends quality testing information in the perception information to the service platform, and the service platform compares the quality testing information of each process with a first count threshold of defective products, then judges whether to check object platform configuration information the according to a comparison result. If it is judged to check the configuration information, the service platform retrieves the object platform configuration information pre-stored by the management platform at the time of system configuration and latest-stored operation information reserved by the management platform, and then performs a parameter comparison with a same parameter name. If all parameter data with the same parameter name is consistent, a check comparison consistent result may be directly fed back to the user platform for display, then a user may rule out that the defective product is resulted from a configuration problem of the object platform based on the information displayed on the user platform. If there is an inconsistency between the parameter data with the same parameter name, the object platform may be controlled to perform a corresponding configuration again and feed a result of reconfiguration (successful configuration or unsuccessful configuration) back to the user platform, then the user may know whether an anomaly of a corresponding device to the object platform is resulted from the device itself or configuration problem based on the result of reconfiguration. In this way, the present disclosure can quickly check whether the defective product is caused by a production line problem and can provide timely and effective correction for the production line problem when applied, thereby saving production costs and reducing the impact of device factors on production progress.

(2) The service platform in the present disclosure adopts a rear split platform arrangement, wherein each sub-platform corresponds to an object platform of a process, independently regulating and analyzing whether a defective product in each object platform is resulted from a configuration problem of the object platform, so as to make an analysis of the defective product of the object platform more efficient when applied. A general service platform focuses on information interaction with each sub-platform of the management platform to reduce the operating load of the sub-platforms of the service platform. The management platform in the present disclosure adopts an independent arrangement, wherein each sub-platform independently manages a corresponding object platform of a process on a production line, which is convenient for information allocation and management of each object platform. The sensor network platform in the present disclosure is configured for information interaction between the management platform and all object platforms on a production line, which has less operating load and adopts a centralized arrangement, so as to save the cost of the Industrial Internet of Things system building in the present disclosure.

BRIEF DESCRIPTION OF THE DRAWINGS

The present disclosure will be further described by way of exemplary embodiments, the exemplary embodiments are described in detail with reference to the drawings. These embodiments are not limited, in these embodiments, the same numeral denotes the same structure, wherein.

DETAILED DESCRIPTION

Figure 1:
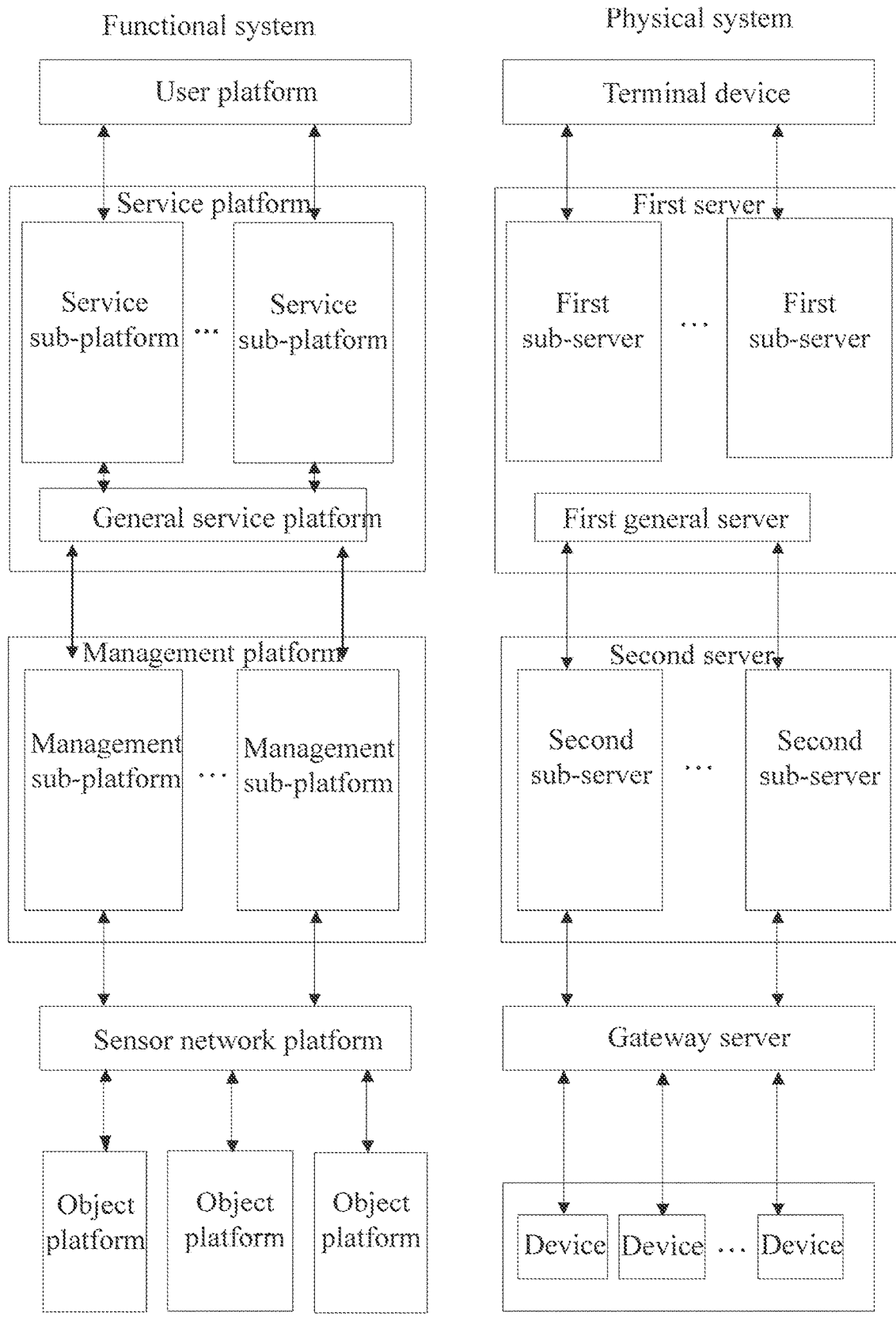
FIG. 1 is an architecture diagram illustrating an Industrial Internet of Things system according to some embodiments of the present disclosure.

In order to more clearly illustrate technical solutions of the embodiments of the present disclosure, the following briefly introduces the drawings that need to be used in the description of the embodiments. Obviously, the accompanying drawings in the following description are only some examples or embodiments of the present disclosure, for those ordinary skilled in the art, the present disclosure can also be applied to other similar scenarios according to these drawings without any creative effort. Unless obviously obtained from the context or the context illustrates otherwise, the same numeral in the drawings denotes the same structure or operation.

It should be understood that the words "system", "device", "unit" and/or "module" as used herein are a method for distinguishing different components, elements, parts, portions, or assemblies of different levels. However, the words may be replaced by other expressions if other words can achieve the same purpose.

As shown in the present disclosure and claims, the words "one", "a", "an" and/or "the" are not specifically singular but may include the plural unless the context expressly suggests otherwise. Generally speaking, the terms "comprise" and "include" only imply that the clearly identified steps and elements are included, and these steps and elements do not constitute an exclusive list, and the method or device may also include other steps or elements.

The flowchart is used in the present disclosure to illustrate operations performed by the system according to the embodiment of the present disclosure. It should be understood that the preceding or following operations are not necessarily performed in order. Instead, various steps may be processed in reverse order or simultaneously. At the same time, other operations can be added to these procedures, or a certain step or steps can be removed from these procedures.

Embodiment 1

As shown in FIG. 1, an Industrial Internet of Things system for a production line when a defective product is produced includes a user platform, a service platform, a management platform, a sensor network platform, and an object platform that interact in turn.

The user platform, configured as a terminal device that interacts with a user, receives information input by the user to generate an instruction, sends the instruction to the service platform, and displays information sent by the service platform to the user.

The service platform, configured as a first server, receives the instruction from the user platform and sends the instruction to the management platform after processing, obtains information required by the user from the management platform, and sends the information to the user platform.

The management platform, configured as a second server, receives the instruction sent by the service platform and regulates an operation of the object platform according to the instruction, and receives and stores perception information sent by the object platform.

The sensor network platform is configured as a communication network and a gateway for interaction between the management platform and the object platform.

The object platform, configured as a production line device for production and a quality testing device for testing a defective product of each process on a production line, receives the instruction from the management platform and sends the perception information to the management platform through the sensor network platform.

In this embodiment, the production line device for production and the quality testing device for testing the defective product of each process are determined according to a product processed in a specific process, wherein the quality testing device may be realized based on existing sensors, test fixtures, test instruments, and other product testing devices. Production line devices and quality testing devices configured in an existing smart manufacturing industrial production line are relatively mature. The embodiment focuses on a production line regulation when a production line produces a defective product, therefore, the production line devices and the quality testing devices may not be described in detail in this embodiment.

During the specific implementation of this embodiment, the user platform are smart electronic devices such as a desktop computer, a laptop computer, a notebook computer, and a mobile phone to realize data processing and data communication, and there are no excessive limitations here. The data processing process of each platform in this embodiment may be processed through a processor of a terminal device and/or a server, and the server is equipped with a corresponding database for storing data, and the database may be stored on the storage device of the server, such as a hard disk. During the specific implementation of this embodiment, parameters of the object platform may be configured according to object platform parameter configuration information input by users. In this embodiment, when instructions are transmitted, the reception processing of the instructions by each platform is specifically processed to a set packet format that is easily recognized by the next level of the receiving object. In this embodiment, different business and management systems are built on different platforms, and data and information may be transmitted and operated in a safe, effective, and timely manner through a unified protocol, thereby forming an organic whole.

Figure 2:
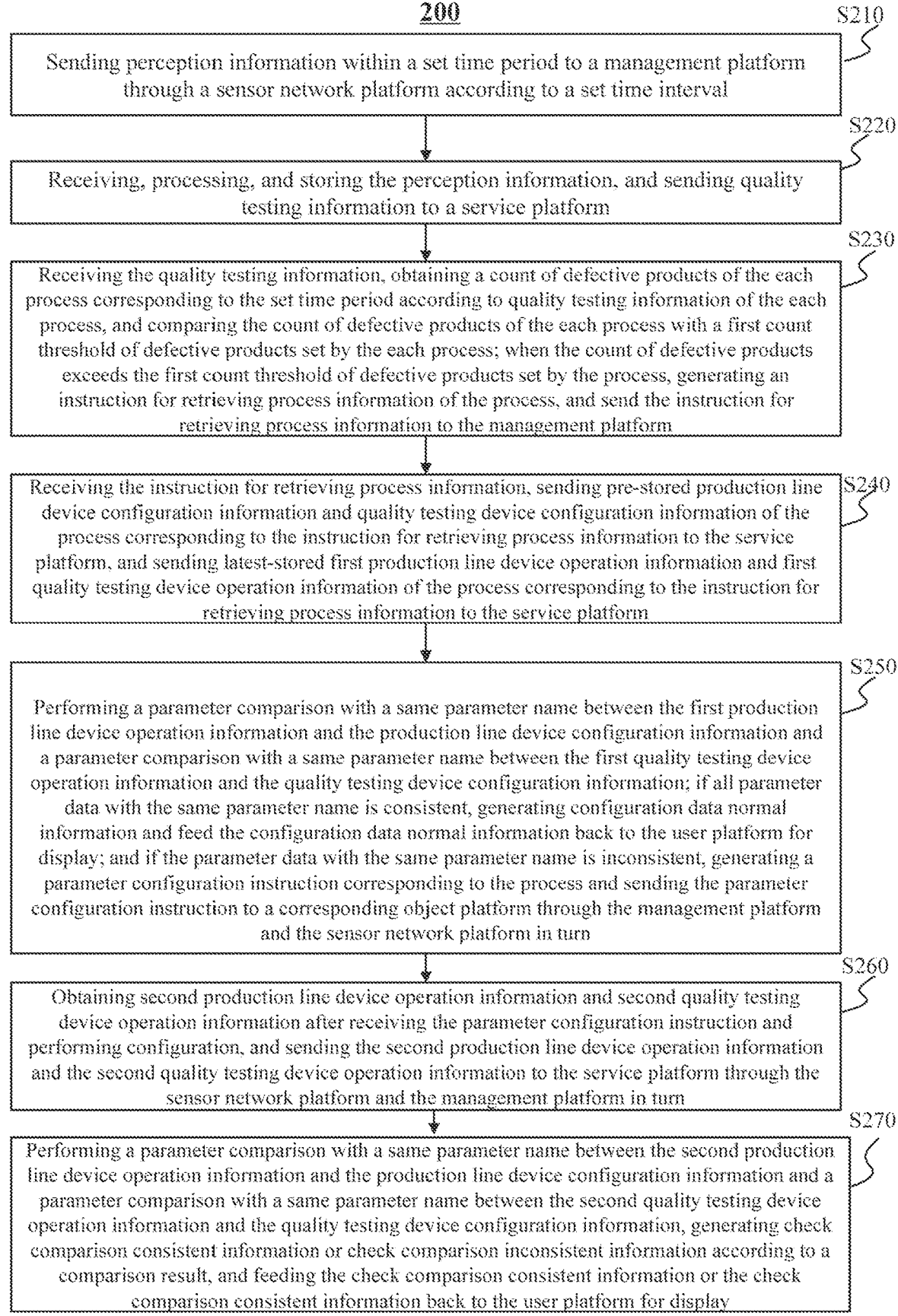
FIG. 2 is a flowchart illustrating an exemplary regulation method for an Industrial Internet of Things system for a production line when a defective product is produced according to some embodiments of the present disclosure.

As shown in FIG. 2, an Industrial Internet of Things system for a production line when a defective product is produced of this embodiment, includes the following steps.

In S210, an object platform is configured to send perception information within a set time period to a management platform through a sensor network platform according to a set time interval.

In S220, the management platform is configured to receive, process, and store the perception information, and send the quality testing information to a service platform.

In S230, the service platform is configured to receive the quality testing information, obtain a count of defective products of the each process corresponding to the set time period according to quality testing information of the each process, and compare the count of defective products of the each process with a first count threshold of defective products set by the each process; when the count of defective products exceeds the first count threshold of defective products set by a process, the service platform is configured to generate an instruction for retrieving process information of the process, and send the instruction for retrieving process information to the management platform.

In S240, the management platform is configured to receive the instruction for retrieving process information, send pre-stored production line device configuration information and quality testing device configuration information of the process corresponding to the instruction for retrieving process information to the service platform, and send latest-stored first production line device operation information and first quality testing device operation information of the process corresponding to the instruction for retrieving process information to the service platform.

In S250, the service platform is configured to perform a parameter comparison with a same parameter name between the first production line device operation information and the production line device configuration information and a parameter comparison with a same parameter name between the first quality testing device operation information and the quality testing device configuration information; if all parameter data with the same parameter name is consistent, generate configuration data normal information and feed the configuration data normal information back to the user platform for display; and if the parameter data with the same parameter name is inconsistent, generate a parameter configuration instruction corresponding to the process and send the parameter configuration instruction to a corresponding object platform through the management platform and the sensor network platform in turn.

In S260, the corresponding object platform is configured to obtain second production line device operation information and second quality testing device operation information after receiving the parameter configuration instruction and performing configuration, and send the second production line device operation information and the second quality testing device operation information to the service platform through the sensor network platform and the management platform in turn.

In S270, the service platform is configured to perform a parameter comparison with a same parameter name between the second production line device operation information and the production line device configuration information and a parameter comparison with a same parameter name between the second quality testing device operation information and the quality testing device configuration information, generate check comparison consistent information or check comparison inconsistent information according to a comparison result, and feed the check comparison consistent information or the check comparison consistent information back to the user platform for display.

In this embodiment, the first count threshold of defective products and the set time interval for the object platform to send the perception information are preset and input by the user through the user platform when the Industrial Internet of Things system is configured. The first count threshold of defective products corresponding to each process may be the same or different. The set time interval for the object platform to send the perception information may ensure that a plurality of products are produced within the set time interval. The first count threshold of defective products corresponding to the each process may be less than an actual count of products produced within the set time interval for the object platform to send the perception information.

In this embodiment, the quality testing information detected by the quality testing device is performance and parameters of a product, and it is determined whether the product is a defective product by calculating whether a difference between testing data and product standard value is within a set difference threshold. The difference threshold ranges from a minimum difference threshold to a maximum difference threshold. When the testing data of a product is lower than the minimum difference threshold or higher than the maximum difference threshold, the product is determined to be a defective product. When the testing data is equal to the minimum difference threshold, equal to the maximum difference threshold, or between the minimum difference threshold and the maximum difference threshold, the product is determined to be a good product.

Reasons for defective products in an smart manufacturing industry include material factors, device factors, environmental factors, and other factors. This embodiment is used to troubleshoot device configuration factors. When a defective product occurs, configuration information of each process is checked through the service platform, and corrections are made if the configuration information is abnormal, which can improve the efficiency of identifying factors that cause a defective product on a production line.

Embodiment 2

This embodiment makes the following further limitations based on Embodiment 1: the service platform in this embodiment adopts a rear split platform arrangement, including a general service platform and a plurality of service sub-platforms. Each service sub-platform is in one-to-one correspondence to a corresponding object platform of each process on the production line. Control information and object platform parameter configuration information are transmitted from the service sub-platforms to the general service platform, and the perception information is transmitted from the general service platform to the service sub-platforms. In this embodiment, the general service platform is configured as a first general server, and the service sub-platform is configured as a first sub-server. The service general platform receives and processes data based on the first general server, and the service sub-platform receives and processes data based on the first sub-server. In this embodiment, the general service platform receives quality testing information of all processes on the production line sent by the management platform, and sends quality testing information of a corresponding object platform of the each process to a corresponding service sub-platform of the process; the corresponding service sub-platform independently compares the count of defective products of the process with the first count threshold of defective products of the process, and independently generates the instruction for retrieving process information of the process when the count of defective products exceeds the first count threshold of defective products, and sends the instruction for retrieving process information to the management platform through the general service platform. In this embodiment, the management platform sends the pre-stored production line device configuration information and quality testing device configuration information, and latest-stored production line device operation information and quality testing device operation information of the process corresponding to the instruction for retrieving process information to the corresponding service sub-platform through the general service platform; and the corresponding service sub-platform performs a parameter comparison with a same parameter name between the production line device configuration information and the production line device operation information and a parameter comparison with a same parameter name between the quality testing device configuration information and the quality testing device operation information.

In this embodiment, the management platform adopts an independent arrangement, which means that the management platform is provided with a plurality of sub-platforms. Each management sub-platform is realized by an independent second sub-server, corresponding to an object platform for data storage, data processing, and/or data transmission. In this embodiment, each management sub-platform receives and processes perception information, an instruction for retrieving process information, and a parameter configuration instruction of the corresponding object platform. In this embodiment, the sensor network platform adopts a centralized arrangement, which means that the sensor network platform receives data, processes data, and sends data uniformly, which is realized by a unified gateway server. In this embodiment, information transmission between the management platform and the object platforms corresponding to all processes on the production line is completed through the sensor network platform.

In this way, when this embodiment is applied, different sub-platforms of the service platform are used to check the configuration information and complete reconfiguration regulation for the object platform corresponding to each process, so that the application of this embodiment can improve the efficiency of system operation and the efficiency of troubleshooting factors that produce defective products.

Embodiment 3

This embodiment makes following further limitations on the basis of Embodiment 1 or Embodiment 2: in S250 of this embodiment, the service platform independently performs a parameter comparison with a same parameter name between the production line device operation information and the production line device configuration information and a parameter comparison with a same parameter name between the quality testing device operation information and the quality testing device configuration information, which specifically includes the following steps. The service platform in this embodiment performs a parameter comparison with a same parameter name between the first production line device operation information and the first production line device configuration information, if all parameter data with a same parameter name is consistent, then generates check comparison consistent information of the production line device and feeds the check comparison consistent information of the production line device back to the user platform for display; if there is an inconsistency between the parameter data with the same parameter name, the service platform generates a first parameter configuration instruction of the corresponding process of the production line device and sends the first parameter configuration instruction to a corresponding object platform through the management platform and the sensor network platform in turn. The corresponding object platform receives the first parameter configuration instruction and performs configuration on the production line device, obtains the second production line device operation information, and sends the second production line device operation information to the service platform through the sensor network platform and the management platform in turn. The service platform performs the parameter comparison with the same parameter name between the second production line device operation information with the production line device configuration information again, and generates the check comparison consistent information or the check comparison inconsistent information of the production line device according to a comparison result, and feeds the check comparison consistent information or the check comparison inconsistent information of the production line device back to the user platform for display.

In this embodiment, the service platform performs a parameter comparison with a same parameter name between the first quality testing device operation information and the quality testing device configuration information, if all parameter data with a same parameter name is consistent, the service platform generates configuration data normal information of the quality testing device and feeds the configuration data normal information of the quality testing device back to the user platform for display; if there is an inconsistency between the parameter data with the same parameter name, then generates a second parameter configuration instruction of the corresponding process of the quality testing device and sends the second parameter configuration instruction to a corresponding object platform through the management platform and the sensor network platform in turn. The corresponding object platform receives the second parameter configuration instruction and performs configuration of the quality testing device, obtains the second quality testing device operation information, and sends the second quality testing device operation information to the service through the sensor network platform and the management platform in turn. The service platform performs the parameter comparison with the same parameter name between the second quality testing device operation information and the quality testing device operation information again, and generates the check comparison consistent information or the check comparison inconsistent information of the quality testing device according to a comparison result, and feeds the check comparison consistent information or the check comparison inconsistent information of the quality testing device back to the user platform for display.

When this embodiment is applied, by independently comparing the production line device operation information with the production line device configuration operation, comparing the quality testing device operation information with the quality testing device configuration information, performing reconfiguration, and independently feeding a corresponding result to the user platform, problems of the production line device and the quality testing device can be fed back more intuitively, and abnormal factors of a device can be more intuitively reflected.

Embodiment 4

This embodiment makes the following further limitations based on any one of Embodiments 1 to 3. The limitations include: apart from generating the configuration data normal information, and the check consistent comparison information or the check comparison inconsistent information, the service platform in this embodiment is also configured to: when a count of defective products in a process exceeds the first count threshold of defective products, compare the count of defective products in the process with a second count threshold of defective products preset by the process. The limitations further include: when the count of defective products in the process exceeds the second count threshold of defective products, the service platform generates information on defective products exceeding a limit in the process and feeds the information back to the user platform for display, wherein the second count threshold of defective products is greater than the first count threshold of defective products; the user platform sends a production line shutdown instruction input by a user to all object platforms associated with the production line through the service platform, the management platform, and the sensor network platform in turn. The object platforms receive the instruction and stop an operation. The second count threshold of defective products is preset during system configuration, and the second count threshold of defective products corresponding to each process may be less than the actual count of products produced within the set time interval for the object platform to send the perception information. In this embodiment, the service platform adopts a rear split platform arrangement, the above additional steps of this embodiment are performed on the service sub-platforms.

When this embodiment is applied, the second count of defective products may be set according to increased production costs caused by an actual count of defective products produced in a corresponding process, influence when products can not be delivered on schedule, or other comprehensive factors. In this embodiment, when a count of defective products produced in a single process seriously exceeds a standard, resource waste caused by a large count of defective products can be avoided by regulating the shutdown of a production line.

Embodiment 5

This embodiment makes the following further limitations based on Embodiment 4. This embodiment also includes the following steps: after generating the configuration data normal information or the check comparison consistent information, the service platform is also configured to: for the each process on the production line, compare the count of defective products of the each process with the first count threshold of defective products and the second count threshold of defective products of the each process, respectively, when the count of defective products of the all processes on the production line is not greater than the second count threshold of defective products of the corresponding processes, and the count of defective products of a plurality of processes is greater than the first count threshold of defective products of the plurality of processes, calculate a count of processes that the count of defective products exceeds the first count threshold of defective products in the all processes on the production line, and then compare the count of the processes with a count threshold of defective product processes on the production line preset by the production line, perform no processing when the count of the processes is less than or equal to the count threshold of defective product processes, or generate information on defective products exceeding a limit on the production line when the count of the processes is greater than the count threshold of defective product processes and feed the information on defective product processes exceeding a limit on the production line back to the user platform for display. The user platform is configured to send the production line shutdown instruction input by the user to all the object platforms associated with the production line through the service platform, the management platform, and the sensor network platform in turn. The object platforms are configured to receive the production line shutdown instruction and stop the operation. The count threshold of defective product processes on the production line may be preset during system configuration. In this embodiment, the service platform adopts the rear split platform arrangement, wherein steps that compare the count of defective products in all processes on the production line with the first count threshold of defective products and the second count threshold of defective products corresponding to the each process respectively are performed on service sub-platforms, and the rest of the steps attached to the service platform are performed on a general service platform. The general service platform generates the information on defective products exceeding a limit on the production line, and sends the information to the user platform through any service sub-platform associated with the production line. The production line shutdown instruction generated by the user platform is sent from any service sub-platform associated with the production line to the general service platform during transmission. A specific service sub-platform through which the information on defective products exceeding a limit on the production line and the production line shutdown instruction transmitted can be preset by a user during system setup.

In this embodiment, when the count of defective processes on the production line exceeds the count threshold of defective product processes set by the production line, production shutdown regulation is also performed to further avoid resource waste caused by a large count of defective products.

Embodiment 6

The embodiment makes the following further limitations on the basis of any one of Embodiments 1 to 5: after generating the configuration data normal information or the check comparison consistent information, the service platform in this embodiment is further configured to: record a count of times when the count of defective products of the each process successively exceeds the first count threshold of defective products set by the process, and then compare the count of times with a count threshold of times of defective product processes preset by the process, perform no processing when the count of times is less than or equal to the count threshold of times of defective product processes, or generate information on a count of occurrence exceeding a limit when the count of times is greater than the count threshold of times of defective product processes and feed the information on a count of occurrence exceeding a limit back to the user platform for display. The user platform is configured to send a production line shutdown instruction input by a user to all object platforms associated with the production line through the service platform, the management platform, and the sensor network platform in turn. The object platforms are configured to receive the instruction and stop an operation. The count threshold of times of defective product processes may be preset during system configuration.

When this embodiment is applied, after the service platform generates the configuration data normal information or the check comparison consistent information, a user can timely check other factors causing defective products exceeding a limit based on the feedback information. Since the object platform is set to send the perception information at the set time interval, if a problem causing a defective product not solved within a total time period of the count threshold of times of defective product processes (a sum of several consecutive set time intervals), the production line shutdown regulation may be made, which can reduce resource waste caused by continuous production of many defective products.

In some embodiments, the Industrial Internet of Things system may be used for managing the production of a carton packaging production line. The perception information also includes carton production device operation information, carton quality testing device operation information, carton quality testing information detected by a carton quality testing device, and sensor information.

The carton packaging production line refers to an automated production line used to produce carton packaging. For example, the carton packaging production line may be used to produce cartons, cardboard, and paper bags.

The carton production device operation information refers to information about an operation status of a carton production device. For example, the carton production device operation information may include an operation time and output of the carton production device. In some embodiments, the object platform may monitor the carton production device in real-time, and then obtain the carton production device operation information.

The carton quality testing device operation information refers to information about an operation status of the carton quality testing device, including an operation time and a test result of the carton quality testing device, etc. In some embodiments, the object platform may monitor the carton quality testing device in real-time, and then obtain the carton quality testing device operation information.

The carton quality testing information refers to relevant testing information used to characterize a quality of the carton. In some embodiments, the carton quality testing information may include image detection information and ultrasonic detection information of the carton.

The image detection information refers to information detected from relevant images of the carton. For example, the image detection information may include a shape, size, position, and color of the carton. In some embodiments, the carton quality testing device may obtain the image detection information based on machine vision technology and deep learning technology, etc.

The ultrasonic detection information refers to relevant information about the carton detected from ultrasonic signals. For example, the ultrasonic detection information may include a thickness, location, and defect of the carton. In some embodiments, the carton quality testing device may obtain the ultrasonic detection information based on an ultrasonic pulse reflection manner, time of flight diffraction (TOFD), etc.

The sensor information refers to information collected from an environment. For example, the sensor information may include temperature information and humidity information during a production process of the carton packaging. In some embodiments, the sensor information may be obtained through a sensor (e.g., a temperature sensor and a humidity sensor).

Figure 3:
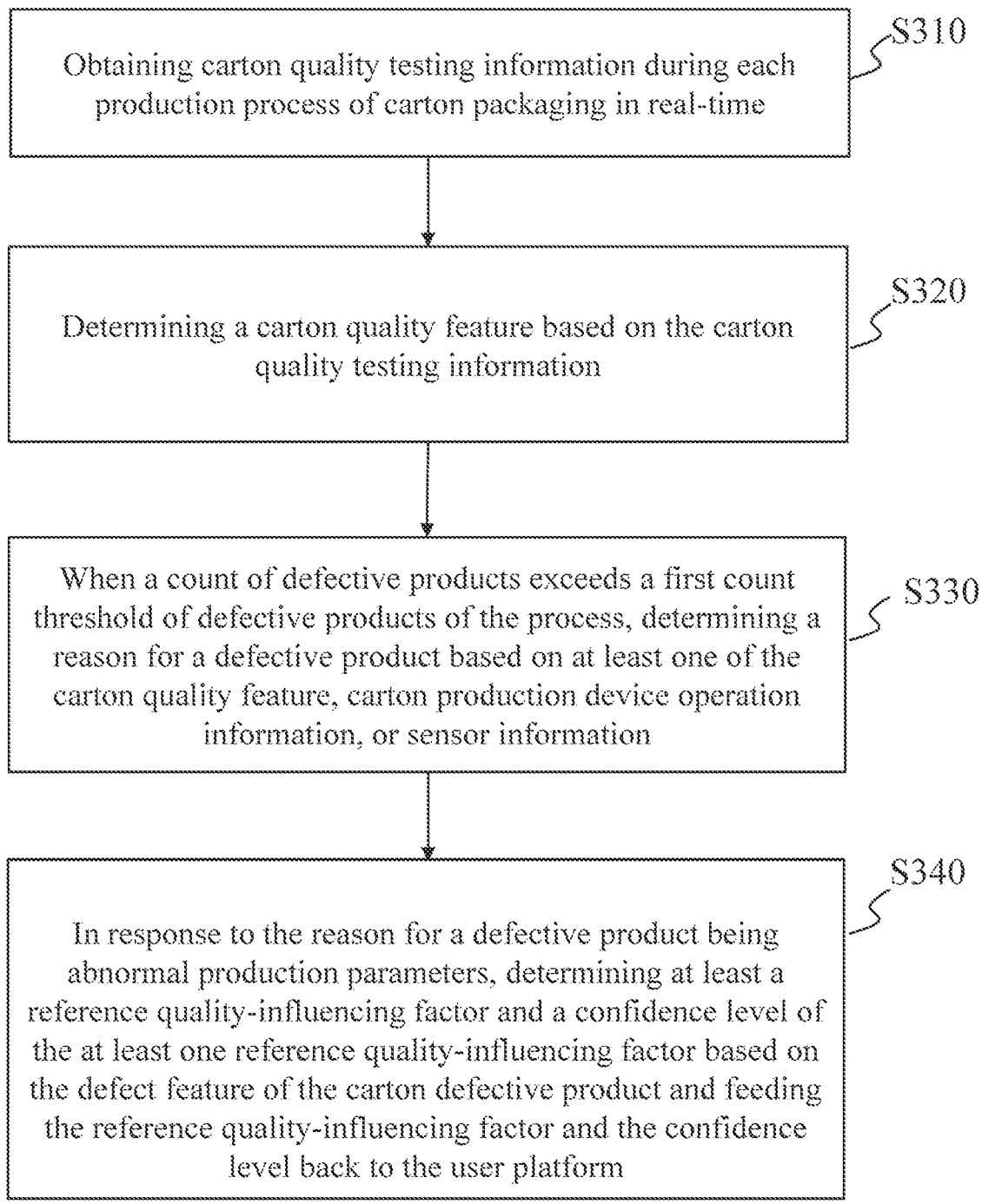
FIG. 3 is a flowchart illustrating an exemplary process for determining a reference quality-influencing factor and a confidence level of the reference quality-influencing factor according to some embodiments of the present disclosure.

FIG. 3 is a flowchart illustrating an exemplary process for determining a reference quality-influencing factor and a confidence level of the reference quality-influencing factor according to some embodiments of the present disclosure. In some embodiments, process 300 may be performed by a processing module. As shown in FIG. 3, the process 300 includes the following steps.

In S310, obtaining carton quality testing information during each production process of carton packaging in real-time.

The production process of carton packaging refers to relevant production processes during the carton packaging. For example, the production process of carton packaging may include a plurality of processes such as creasing, paper separation, printing, slotting or die-cutting, nailing, or box pasting.

In some embodiments, the carton quality testing information may be obtained by a carton quality testing device. For example, the carton quality testing device may obtain the carton quality testing information based on machine vision technology, deep learning technology, an ultrasonic pulse reflection manner, and a diffraction time of flight manner.

In S320, determining a carton quality feature based on the carton quality testing information.

The carton quality feature refers to a feature that characterizes the quality of a carton. For example, the carton quality feature may include a strength and impact resistance of the carton.

In some embodiments, the carton quality feature includes whether the carton is a carton defective product and a defect feature of the carton defective product.

The carton defective product refers to a carton whose quality does not satisfy a requirement. For example, the carton defective product may be a carton with at least one of an abnormality in size, shape, printed graphics, strength, surface quality, or sealing quality. The abnormality in shape includes deformation, cracks, wrinkles, irregular joints, irregular edges, overlapped corners, damage, stains, etc. The abnormality in printed graphics includes lines that are too thick, too light, uneven, color difference, position shift, etc. The abnormality in strength includes a tensile strength and a compressive strength not satisfying a requirement, etc. The abnormality in strength may be distinguished by a deformation of the carton when it goes through different processes, such as a degree of sagging when die-cutting and slotting. The abnormality in surface quality includes defects such as stains and damage on a surface of the carton, etc. The abnormality in sealing quality includes holes around the carton, existence of jags and gaps after the lids are closed, etc.

The defect feature refers to a feature of the carton defective product. For example, the defect feature may include an abnormal size, an abnormal shape, an abnormal printed graphics, and an abnormal surface quality of the carton defective product. As another example, the defect feature may also include an abnormal strength and an abnormal sealing quality of the carton defective product.

In some embodiments, the carton quality feature may be determined in a plurality of ways. For example, the processing module may determine the carton quality feature by means of experimental testing. Specifically, the carton quality feature may be obtained by testing the strength and size of the carton with the carton quality testing device. As another example, the processing module may determine the carton quality feature by means of analysis. Specifically, the carton quality feature may be obtained by performing simulation analysis on physical and mechanical properties of the carton.

In some embodiments, the processing module may determine a defect compliance of the carton to different defect types using a defect judgment model; determine the carton quality feature based on the defect compliance of the carton to different defect types. For more details about the defect judgment model, please refer to FIG. 4 and its related descriptions.

In S330, when a count of defective products exceeds a first count threshold of defective products of the process, determining reason for a defective product based on at least one of the carton quality feature, the carton production device operation information, or the sensor information.

The count of defective products may be obtained based on statistics. For example, the processing module may obtain and record a count of defective products in real-time during a quality testing process of the carton.

The first count threshold of defective products refers to a limit value of a count of defective products tested in a certain process in a carton packaging production line. In some embodiments, the first count threshold of defective products may be determined based on a preset approach. For example, the first count threshold of defective products may be preset based on an industry standard and a production capacity.

The reason for a defective product refer to reason that lead to the production of the carton defective product. For example, the reason for a defective product may include accidental factors (e.g., power outages and increased humidity), and an abnormality in production parameters. The abnormality in production parameters refers to that a plurality of production parameters does not satisfy a specified standard during a production process, resulting in the carton defective product. For example, the abnormality in production parameters may include an abnormality in production line device operation information during the production process of the carton, an abnormality in production raw materials (such as paper, ink, glue), or the like.

In some embodiments, when the count of defective products exceeds the first count threshold of defective products of a corresponding process, the processing module may determine the reason for a defective product through a first preset comparison table based on at least one of the carton quality feature, the carton production device operation information, or the sensor information.

In some embodiments, the first preset comparison table includes a corresponding relationship between a plurality of reference carton quality features, a plurality of carton production device operation information and/or a plurality of different reference sensor information, and a plurality of reference reasons for a defective product. In some embodiments, the corresponding relationship between the plurality of reference carton quality features, the plurality of carton production device operation information and/or the plurality of different reference sensor information, and the plurality of reference reasons for a defective product may be constructed based on prior knowledge or historical data (e.g., historical data during a historical production process that produced a historical carton defective product) to obtain the first preset comparison table.

In some embodiments, the processing module may retrieve in the first preset comparison table based on at least one of the carton quality feature, the carton production device operation information, and the sensor information, and determine a similar reference carton quality feature, similar reference carton production device operation information, and/or similar reference sensor information, and determine corresponding reference reasons for the reference defective product as final reason for a defective product.

In some embodiments, the processing module may periodically record at least one of location distribution information or defect feature distribution information of the carton defective product based on the carton quality feature; determine the reason for a defective product based on at least one of the location distribution information, the defect feature distribution information, the carton production device operation information, or production line device configuration information.

A periodical recording refers to recording carton defective products every period unit. The period unit may include but is not limited to a time, a process, a count of cartons, etc. For example, the processing module may take x cartons as a period to record the location distribution information and the defect feature distribution information of carton defective products among the x cartons.

The location distribution information refers to a location distribution of carton defective products. For example, the location distribution information of the carton defective products may include a concentrated location distribution, a uniform location distribution, or the like. The concentrated location distribution refers to a concentrated location of the carton defective products, for example, a plurality of cartons produced continuously are all carton defective products. The uniform location distribution refers to that a location of the carton defective products is relatively discrete, for example, a carton defective product appears every certain count of cartons.

The location distribution information may be obtained through the periodic recording of the carton quality testing device. For example, the carton quality testing device tests a carton and records a carton defective product to obtain the location distribution information.

The defect feature distribution information refers to a distribution of a defect feature of the carton defective products. For example, the defect feature distribution information may include a defect feature concentrated distribution, a defect feature uniform distribution, or the like. The defect feature concentrated distribution refers to a concentrated location of carton defective products with a certain defect feature. For example, a plurality of cartons produced continuously all have a certain defect feature. The defect feature uniform distribution refers to an even distribution of carton defective products with a certain defect feature, for example, a carton defective product with a certain defect feature appears every certain count of cartons.

The defect feature distribution information may be obtained through the periodic recording of the carton quality testing device. For example, the carton quality testing device tests a carton and records a defect feature of a carton defective product to obtain the defect feature distribution information.

In some embodiments, the processing module may determine the reason for a defective product based on at least one of the location distribution information, the defect feature distribution information, the carton production device operation information, or the production line device configuration information through a preset rule. An exemplary preset rule may include that: if the location distribution of the carton defective products is relatively concentrated, and most of the carton defective products have a same defect type, it may be considered that the reason for a defective product are abnormal production parameters.

In some embodiments of the present disclosure, by analyzing the location distribution information, the defect feature distribution information, the carton production device operation information, and the production line device configuration information, the reason for a defective product may be determined, which can improve production efficiency, reduce the count of defective products, and improve the quality of cartons.

In some embodiments, the processing module may determine a count of defect types and a frequency of occurrence of each defect type within a statistical period based on the defect feature distribution information; determine a defect concentration degree based on the count of defect types and the frequency of occurrence of each defect type; determine a continuity of occurrence of the carton defective products based on the location distribution information of the carton defective products; and determine the reason for a defective product based on the defect concentration and the continuity of occurrence of the carton defective products.

The statistical period refers to a period in which the periodical recording is performed. For example, the statistical period may be a process or a time period.

The count of defect types refers to a count of defect types that appear within the statistical period. The count of defect types may be obtained by recording and analyzing the defect feature distribution information.

The frequency of occurrence of each defect type refers to a count of occurrences of a certain type of defect feature within the statistical period. The frequency of occurrence of each defect type may be obtained by recording and analyzing the defect feature distribution information.

The defect concentration degree refers to a degree of concentration of a defect feature. In some embodiments, the defect concentration degree is negatively correlated with the count of defect types, for example, the smaller the count of defect types within a statistical period, the higher the defect concentration degree. In some embodiments, the defect concentration degree is positively correlated with frequency of occurrence of a defect type that occurs most frequently within a statistical period, for example, the more a count of occurrences of the defect type, the higher the defect concentration degree.

In some embodiments, the processing module may determine the defect concentration degree based on the count of defect types and the frequency of occurrence of each defect type in a plurality of ways. For example, the defect concentration degree may be determined by the following equation (1).

$$y = \frac{X_{max}}{\sum_{i=1}^{n} x_i} \quad (1)$$

where y denotes the defect concentration degree, n denotes a count of defect types, $x_i$ denotes a frequency of occurrence of an i-th defect type within a statistical period, $0 \leq i \leq n$, $X_{max}$ denotes a frequency of occurrence of a defect type that occurs most frequently within the statistical period.

The continuity of occurrence of the carton defective products refers to a degree of continuous occurrence of the carton defective products. The continuity of occurrence of the carton defective products may be represented by a numerical value, and the larger the value, the more concentrated locations of the carton defective products are.

In some embodiments, the processing module may determine the continuity of occurrence of the carton defective products based on the location distribution information of the carton defective products in a plurality of ways. For example, the processing module may determine a maximum count of continuous carton defective products as a value corresponding to the continuity.

In some embodiments, the processing module may determine the reason for a defective product based on the defect concentration degree and the continuity of occurrence of the carton defective products in a plurality of ways. For example, if the production line device operation information is completely consistent with the production line device configuration information, but the continuity exceeds a corresponding threshold (e.g., a plurality of cartons in a row are all defective products), and the defect concentration degree exceeds a corresponding threshold (e.g., defect types of most carton defective products are the same), the reason for a defective product may include the abnormal production parameters.

In some embodiments of the present disclosure, by analyzing the defect concentration degree and the continuity of occurrence of the carton defective products, the reason for a defective product may be determined, so that a user can ignore accidental factors resulting in a defective product, henceforth avoiding affecting production efficiency. At the same time, for a defective product caused by the abnormal production parameters, the user may intervene in time, henceforth avoiding producing more defective products and improving production efficiency.

In S340, in response to the reason for a defective product being the abnormal production parameters, determining at least a reference quality-influencing factor and a confidence level of the at least one reference quality-influencing factor based on the defect feature of the carton defective product and feeding the reference quality-influencing factor and the confidence level back to the user platform.

The reference quality-influencing factor refers to an influencing factor that causes a carton defective product. For example, the reference quality-influencing factor may include an improper ink concentration, an improper printing pressure, and a screen loss.

The confidence level refers to a level of credibility of a certain defect feature caused by a reference quality-influencing factor. The confidence level is used to measure the level of credibility of the reference quality-influencing factor, and the higher the confidence level, the greater the level of credibility of the reference quality-influencing factor causing a certain defect feature.

Different defect features may correspond to at least a different reference quality-influencing factor, and each reference quality-influencing factor has a preset confidence level. A corresponding relationship between the different defect features with the at least a reference quality-influencing factor and the confidence level of the at least a reference quality-influencing factor may be determined based on prior knowledge or historical data. In some embodiments, the processing module may determine the at least a reference quality-influencing factor and the confidence level of the at least a reference quality-influencing factor based on the defect feature of the carton defective product through the corresponding relationship.

In some embodiments, the processing module may obtain a suspicious quality-influencing factor for defect types that have occurred in the carton defective product; construct a quality correlation diagram based on the defect types and the suspicious quality-influencing factor; input the quality correlation diagram into an evaluation model to determine a confidence level of the suspicious quality-influencing factor; and determine a suspicious quality-influencing factor whose confidence level satisfies a preset requirement as the reference quality-influencing factor. For more content about determining the reference quality-influencing factor, please refer to relevant descriptions in FIG. 5.

In some embodiments of the present disclosure, determining the carton quality feature, the reason for a defective product, and the reference quality-influencing factor based on the carton quality testing information utilizes characterization of defects of the carton on image and ultrasonic feedback and judges whether the carton has a quality defect through an image comparison, which enables an Industrial Internet of Things system to realize rapid quality testing of a produced carton on a production line, improving the efficiency of the Industrial Internet of Things system.

Figure 4:
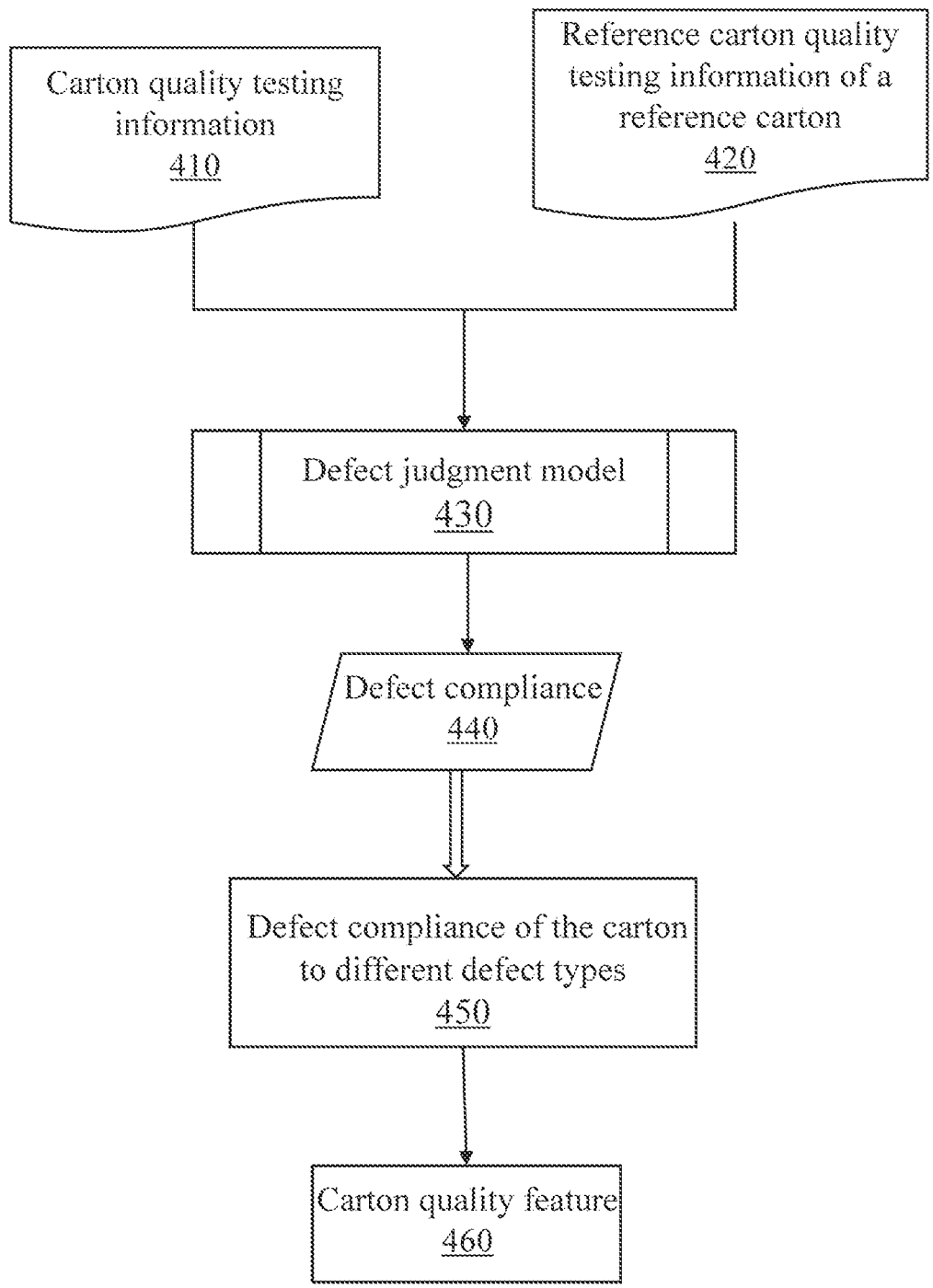
FIG. 4 is a schematic diagram illustrating an exemplary process for determining a carton quality feature according to some embodiments of the present disclosure.

FIG. 4 is a schematic diagram illustrating an exemplary process for determining a carton quality feature according to some embodiments of the present disclosure.

In some embodiments, a processing module may use a defect judgment model 430 to determine a defect compliance 450 of a carton to different defect types; and determine a carton quality feature 460 based on the defect compliance 450 of the carton to different defect types.

The defect type refers to a type of defect feature. For example, the defect type may include an abnormal size, an abnormal shape, an abnormal printed graphics, and an abnormal surface quality.

In some embodiments, the defect judgement model 430 may be a machine learning model. For example, the defect judgment model 430 may be any one or a combination of a recurrent neural network model, a convolutional neural network model, or other self-defined model structures.

In some embodiments, an input of the defect judgment model 430 may include carton quality testing information 410 and reference carton quality testing information 420 of a certain reference carton, and an output of the defect judgment model 430 may include a defect compliance 440 between the carton and the reference carton. In some embodiments, the carton quality testing information 410 may include at least one of image testing information or ultrasonic testing information. For more content about the carton quality testing information, please refer to FIG. 3 and its related descriptions.

The defect judgment model 430 may be executed for a plurality of times, and for each time when it is executed, carton quality testing information of a current carton and reference carton quality testing information of a reference carton are input to the defect judgment model, and the defect compliance 440 between the current carton and the reference carton is output. In some embodiments, the defect judgment model may obtain the defect compliance 450 between the carton to different defect types by processing reference quality testing information of a plurality of reference cartons. The plurality of reference cartons may include different reference cartons with a same defect type. The plurality of reference cartons may further include different reference cartons with different defect types.

The reference carton refers to a carton used for a comparison with a carton defective product. For example, the reference carton may include a carton with only a defect type.

The reference carton quality testing information refers to carton quality testing information corresponding to the reference carton. For example, the reference carton quality testing information may include image testing information and ultrasonic testing information of the reference carton.

The reference carton quality testing information may be determined in a plurality of ways. In some embodiments, carton quality testing information of a reference carton with only a defect type may be obtained by a carton quality testing device and determined as the reference carton quality testing information. In some embodiments, testing information of a defect type may be fused with quality testing information of a normal carton to obtain the reference carton quality testing information. For example, image testing information whose defect type is "dull printed pattern" may be fused with image testing information of a normal carton to obtain a virtual image with only a defect type of "dull printed pattern" as the reference carton quality testing information. For more content about image testing information, please refer to FIG. 3 and its related descriptions.

The defect compliance refers to a level of compliance between a defect type of the current carton with a defect type of the reference carton. The defect compliance may be represented by 0 or 1, wherein 0 represents that the defect type of the current carton does not match the defect type of the reference carton, and 1 means that the defect type of the current carton matches the defect type of the reference carton.

In some embodiments, the defect judgment model 430 may be obtained by training a plurality of first training samples with a first label. For example, the plurality of first training samples with a first label may be input into an initial defect judgment model, a loss function is constructed through the first label and a result of the initial defect judgment model, and parameters of the initial defect judgment model are iteratively updated based on the loss function by gradient descent or other manners. When a model training satisfying a preset condition is completed, the trained defect judgment model 430 is obtained. The preset condition may be that the loss function converges, a count of iterations reaches a threshold, or the like.

In some embodiments, the first training sample may at least include carton quality testing information of a plurality of types of sample cartons in a plurality of processes. Data for each training includes a set of carton quality testing information. The set of carton quality testing information may include quality testing information of two sample cartons. For example, the data for each training may include carton quality testing information of two non-defective sample cartons respectively, carton quality testing information of a defective sample carton, and carton quality testing information of a non-defective sample carton, carton quality testing information of two defective sample cartons with different defect types or carton quality testing information of two defective sample cartons with same defect types.

In some embodiments, the first label may include whether defect types of the two sample cartons are the same. If the defect types are the same, the first label is 1, and if the defect types are different, the first label is 0. In some embodiments, a defect compliance of the two non-defective sample cartons may be 1.

In some embodiments, the first training sample may be obtained based on historical carton quality testing information. The first label may be marked manually.

In some embodiments, the processing module may determine carton quality feature 460 based on the defect compliance 450 of the carton to different defect types. In some embodiments, the processing module may determine a compliance rate of the carton to each defect type based on the defect compliance 450 of the carton to different defect types, and if a compliance rate of a certain defect type is higher than a compliance rate threshold, then determine the carton quality feature 460 at least including the defect type. The compliance rate refers to a ratio of a count of defect compliance with a defect compliance being 1 to a total count of defect compliance corresponding to the defect type among a plurality of defect compliance of the current carton to a certain defect type.

In some embodiments of the present disclosure, determining the defect compliance by the defect determination model and determining the carton quality feature based on the defect compliance utilizes characterization of defects of the carton on image and ultrasound feedback and determines whether the carton has a quality defect through an image comparison. Training is performed by data of carton quality testing information of different cartons and processes, which enables an Industrial Internet of Things system to be applied to a quality testing of different cartons and processes, henceforth improving the applicability of the Industrial Internet of Things system.

Figure 5:
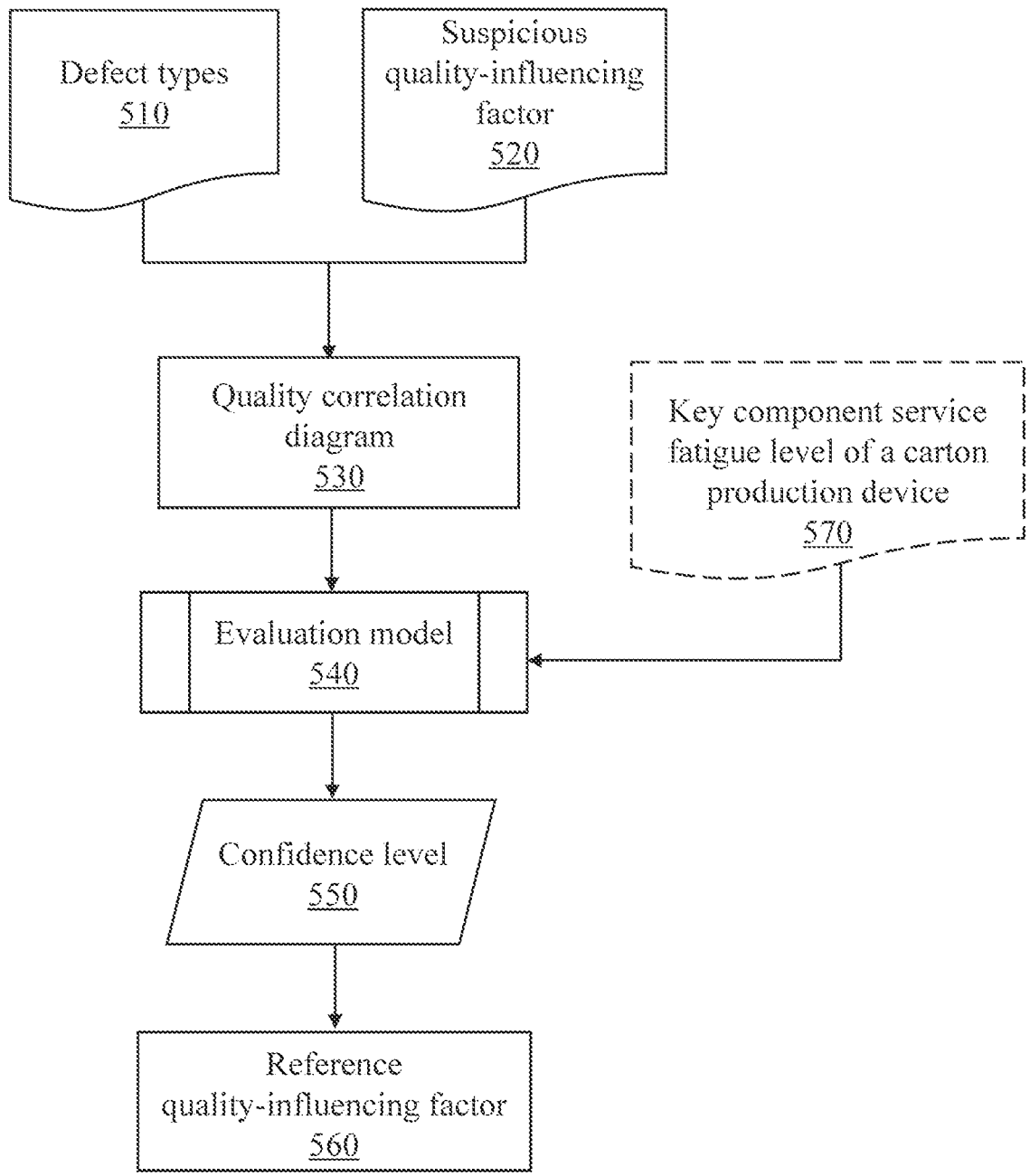
FIG. 5 is a schematic diagram illustrating an exemplary process for determining a reference quality-influencing factor according to some embodiments of the present disclosure.

FIG. 5 is a schematic diagram illustrating an exemplary process for determining a reference quality-influencing factor according to some embodiments of the present disclosure.

In some embodiments, a processing module may obtain a suspicious quality-influencing factor 520 of defect types 510 that have occurred in a carton defective product; construct a quality correlation diagram 530 based on the defect types 510 and the suspicious quality-influencing factor 520; input the quality correlation diagram 530 into an evaluation model 540, and determine a confidence level 550 of the suspicious quality-influencing factor 520; determine a suspicious quality-influencing factor whose confidence level 550 satisfies a preset requirement as a reference quality-influencing factor 560.

The suspicious quality-influencing factor 520 refers to a suspicious factor leading to a carton defective product. For example, if a defect type is that a printing pattern is not clear, the suspicious quality-influencing factor may include an improper ink concentration, an improper printing pressure, or a screen loss. As another example, if the defect type is poor sealing, carton deformation, or stains, the suspicious quality-influencing factor may include an uneven glue when gluing a carton. For more content about the defect type, please refer to FIG. 4 and its related descriptions.

In some embodiments, the processing module may determine the suspicious quality-influencing factor based on historical data. For example, one or more historical quality-influencing factors of a certain defect type may be determined as the suspicious quality-influencing factor. As another example, among the one or more historical quality-influencing factors of a certain defect type, a historical quality-influencing factor whose occurrence ratio is higher than a preset threshold may be determined as the suspicious quality-influencing factor.

In some embodiments, the processing module may construct the quality correlation diagram 530 based on the defect types 510 that have occurred in a carton defective product and the suspicious quality-influencing factor 520 corresponding to the defect types. The quality correlation diagram is a data structure consisting of nodes and edges, edges of which connect nodes, and nodes and edges may have attributes.

In some embodiments, nodes of the quality correlation diagram 530 may include class I nodes and class II nodes. The class I nodes correspond to the defect types that have occurred in a carton defective product. The class II nodes correspond to suspicious quality-influencing factors corresponding to each defect type.

An attribute of the class I node may include an occurrence frequency of a defect type, a compliance rate of the defect type, or the like. For more content about the compliance rate, please refer to FIG. 4 and its related descriptions. An attribute of the class II node may include an occurrence ratio of the suspicious quality-influencing factor among historical quality-influencing factors. The historical quality-influencing factors are associated with a certain defect type.

In some embodiments, edges of the quality correlation diagram 530 may include a class I edge, a class II edge, and a class III edge.

The class I edge is an edge between the class I nodes, which corresponds to a correlation relationship between defect types. For example, there is a class I edge between a class I node whose defect type is "irregular joint of a carton" and a class I edge whose defect type is "poor sealing of a carton".

The class II edge is an edge between the class II nodes, which corresponds to a correlation relationship between suspicious quality-influencing factors. For example, there is a class II edge between a class II node whose suspicious quality-influencing factor is "low printing pressure" and a class II node whose suspicious quality-influencing factor is "unstable printing device operating power".

The class III edge is an edge between the class I node and the class II node, which corresponds to a correlation relationship between the defect types and the suspicious quality-influencing factors. For example, there is a class III edge between a class I node whose defect type is "unclear printing pattern" and a class II node whose suspicious quality-influencing factor is "improper ink concentration" and a class III edge between the class I node whose defect type is "unclear printing pattern" and a class III node whose suspicious quality-influencing factor is "improper printing pressure" respectively.

In some embodiments, an attribute of the edge may include a correlation strength between corresponding correlation relationships. The correlation strength may reflect a probability of a correlation relationship between two items. The correlation strength may be represented by a numerical value from 0 to 1, and the larger the numerical value, the greater the probability of the correlation relationship. In some embodiments, the correlation strength may be obtained through recording historical data.

Attributes of the nodes and the edges may be determined in a plurality of ways based on basic data. A data source may be approaches described in other embodiments or other manners. The basic data may include data at a current time and include historical defect types, historical quality-influencing factors, etc.

In some embodiments, the evaluation model 540 may be a machine learning model. For example, the evaluation model 540 may be a graph neural network (GNN) model. The evaluation model 540 may also be other graph models, such as a graph convolutional neural network (GCNN) model, or add other processing layers into the graph neural network model, modify a processing manner of the graph neural network model, or the like.

In some embodiments, an input of the evaluation model 540 may include the quality correlation diagram 530, and an output of the evaluation model 540 may include the confidence level 550 of a suspicious quality-influencing factor, wherein the class II node in the GNN outputs the confidence level 550 of the suspicious quality-influencing factor. For more content about the confidence level, please refer to FIG. 3 and its related descriptions.

In some embodiments, the input of the evaluation model 540 may also include a key component service fatigue level 570 of a carton production device.

The key component service fatigue level 570 refers to a level of fatigue damage of a key component during use. Exemplary key components may include but are not limited to a blade of a die-cutting device, a screen of a printing device, and other components.

In some embodiments, a service fatigue level may be determined based on a count of times the key component has been used and a designed service life of the key component. For example, a ratio of a count of times of a certain key component has been used to a designed service life of the key component may be used as the key component service fatigue level. The designed service life of the key component may be obtained by querying a cloud database, and the count of times the key component has been used may be determined by querying a data record database.

In some embodiments of the present disclosure, inputting the service fatigue level into the evaluation model 540 may obtain the confidence level 550 of the suspicious quality-influencing factor, which can fully consider the fatigue damage of the key component in a carton production device during use, so that an obtained confidence level can be more in line with an actual situation, improving the accuracy of the evaluation model 540.

In some embodiments, the evaluation model 540 may be obtained by training a plurality of second training samples with a second label. For example, the plurality of second training samples with the second label are input into an initial defect judgment model, a loss function is constructed through the second label and a result of the initial defect judgment model, and parameters of the initial defect judgment model are iteratively updated based on the loss function by gradient descent or other manners. When a model training satisfying a preset condition is completed, the trained evaluation model 540 is obtained. The preset condition may be that the loss function converges, a count of iterations reaches a threshold, or the like.

In some embodiments, the second training sample may at least include a plurality of sample quality correlation diagrams, wherein nodes and attributes of the nodes, edges, and attributes of the edges of the sample quality correlation diagrams are similar to the quality correlation diagram 530. The second label may include a confidence level of each suspicious quality-influencing factor. In some embodiments, the second training sample may be obtained based on historical data. The second label may be marked manually.

In some embodiments, the second training sample may also include a sample key component service fatigue. The sample key component service fatigue may be obtained based on historical data.

In some embodiments, the processing module may determine a suspicious quality-influencing factor whose confidence level satisfies a preset requirement as the reference quality-influencing factor. The preset requirement may be that the confidence level is greater than a confidence level threshold, the confidence level is the largest, or the like. For example, the processing module may determine a suspicious quality-influencing factor whose confidence level is greater than a preset confidence level threshold as the reference quality-influencing factor. As another example, the processing module may determine a suspicious quality-influencing factor with a highest confidence level as the reference quality-influencing factor.

In some embodiments of the present disclosure, inputting the quality correlation diagram into the evaluation model to obtain the confidence level of the suspicious quality-influencing factor can clarify a correlation between the defect type and the suspicious quality-influencing factor, henceforth obtaining a confidence level of each suspicious quality-influencing factor, and obtain a reference quality-influencing factor and a confidence level of the reference quality-influencing factor of the current carton defective product, so that the Industrial Internet of Things system can adjust corresponding production parameters in a targeted manner and reduce a rate of carton defective products.

The embodiment of the present disclosure also provides a computer-readable storage medium storing computer instructions, wherein when reading the computer instructions, a computer executes the regulation method.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or collocation of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. An Industrial Internet of Things system for a production line when a defective product is produced, comprising: a user platform, a service platform, a management platform, a sensor network platform, and an object platform that interact in turn, wherein:

the object platform is configured to be a production line device to perform production and a defective product testing device configured to perform defective product testing in each process on the production line;

the object platform is further configured to send perception information within a set time period to the management platform through the sensor network platform; the perception information includes production line device operation information, defective product testing device operation information, and defective product testing information tested by the defective product testing device; and receive a parameter configuration instruction and complete configuration;

the sensor network platform is configured to be a communication network and gateway for an interaction between the management platform and object platform;

the management platform is configured to receive, process, and store the perception information, and send the defective product testing information to the service platform; receive an instruction for retrieving process information sent by the service platform, send pre-stored production line device configuration information and defective product testing device configuration information of a process corresponding to the instruction for retrieving process information to the service platform, and send latest-stored production line device operation information and defective product testing device operation information of the process corresponding to the instruction for retrieving process information to the service platform;

the service platform is configured to receive the defective product testing information, obtain a count of defective products of the each process corresponding to the set time period according to defective product testing information of the each process, and compare the count of defective products of the each process with a first count threshold of defective products set by the each process; when a count of defective products of a process exceeds the first count threshold of defective products set by the process, the service platform is configured to generate an instruction for retrieving process information of the process, and send the instruction for retrieving process information to the management platform; perform a parameter comparison with a same parameter name between the production line device operation information and the production line device configuration information and a parameter comparison with a same parameter name between the defective product testing device operation information and the defective product testing device configuration information; if all parameter data with the same parameter name is consistent, generate configuration data normal information and feed the configuration data normal information back to the user platform for display; and if the parameter data with the same parameter name between the production line device operation information and the production line device configuration information is inconsistent or the parameter data with the same parameter name between the defective product testing device operation information and the defective product testing device configuration information is inconsistent, generate a parameter configuration instruction corresponding to the process and send the parameter configuration instruction to a corresponding object platform through the management platform and the sensor network platform in turn; after the corresponding object platform completing configuration, receive production device operation information and defective product testing device operation information sent by the corresponding object platform through the sensor network platform and the management platform in turn, perform a parameter comparison with a same parameter name between the production line device operation information and the production line device configuration information, and a parameter comparison with a same parameter name between the defective product testing device operation information and the defective product testing device configuration information again; generate check comparison consistent information or check comparison inconsistent information according to a comparison result, and feed the check comparison consistent information or the check comparison inconsistent information back to the user platform for display;

the user platform is configured to be a terminal device interacted with a user, receive information input by the user and generate an instruction and send the instruction to the service platform, and display information sent by the service platform to the user;

the service platform is configured to compare a count of defective products of a process whose the count of defective products exceeds a first count threshold of defective products preset by the process with a second count threshold of defective products preset by the process, and the second count threshold of defective products exceeds the first count threshold of defective products, generate information on defective products exceeding a limit in the process and feed the information on defective products exceeding a limit in the process back to the user platform for display when the count of defective products of the process exceeds the second count threshold of defective products; then the user platform is configured to send a production line shutdown instruction input by a user to all object platforms associated with the production line through the service platform, the management platform, and the sensor network platform in turn; and then the object platforms are configured to receive the production line shutdown instruction and stop an operation; and the service platform is configured to record a count of times when the count of defective products of the each process successively exceeds the first count threshold of defective products set by the process, and then compare the count of times with a count threshold of times of defective product processes preset by the process, perform no processing when the count of times is less than or equal to the count threshold of times of defective product processes, or generate information on a count of occurrence exceeding a limit when the count of times is greater than the count threshold of times of defective product processes and feed the information on a count of occurrence exceeding a limit back to the user platform for display; then the user platform is configured to send the production line shutdown instruction input by the user to all object platforms associated with the production line through the service platform, the management platform, and the sensor network platform in turn; and then the object platforms are configured to receive the production line shutdown instruction and stop the operation.

2. A regulation method for an Industrial Internet of Things system for a production line when a defective product is produced, wherein the method is executed based on a user platform, a service platform, a management platform, a sensor network platform, and at least one object platform that interact in turn, the object platform includes a production line device configured to perform production and a defective product testing device to perform defective product testing in each process on the production line, comprising:

step 1, sending, by the object platform, perception information within a set time period to the management platform through the sensor network platform; the perception information including production line device operation information, defective product testing device operation information, and defective product testing information tested by the defective product testing device;

step 2, receiving, processing, and storing, by the management platform, the perception information, and sending the defective product testing information to the service platform;

step 3, receiving, by the service platform, the defective product testing information, obtaining a count of defective products of the each process corresponding to the set time period according to defective product testing information of the each process, and comparing the count of defective products of the each process with a first count threshold of defective products set by the each process; determining that a count of defective products of a process exceeds the first count threshold of defective products set by the process, in response to determining that the count of defective products of a process exceeds the first count threshold of defective products set by the process, generating an instruction for retrieving process information of the process, and sending the instruction for retrieving process information to the management platform;

step 4, receiving, by the management platform, the instruction for retrieving process information, sending pre-stored production line device configuration information and defective product testing device configuration information of the process corresponding to the instruction for retrieving process information to the service platform, and sending latest-stored production line device operation information and defective product testing device operation information of the process corresponding to the instruction for retrieving process information to the service platform;

step 5, performing, by the service platform, a parameter comparison with a same parameter name between the production line device operation information and the production line device configuration information and a parameter comparison with a same parameter name between the defective product testing device operation information and the defective product testing device configuration information; determining that the parameter data with the same parameter name between the production line device operation information and the production line device configuration information is inconsistent or the parameter data with the same parameter name between the defective product testing device operation information and the defective product testing device configuration information is inconsistent, in response to determining that the parameter data with the same parameter name between the production line device operation information and the production line device configuration information is inconsistent or the parameter data with the same parameter name between the defective product testing device operation information and the defective product testing device configuration information is inconsistent, generating a parameter configuration instruction corresponding to the process and sending the parameter configuration instruction to a corresponding object platform through the management platform and the sensor network platform in turn;

sending, by the corresponding object platform, production line device operation information and defective product testing device operation information to the service platform through the sensor network platform and the management platform in turn after receiving the parameter configuration instruction and performing configuration; and performing, by the service platform, a parameter comparison with a same parameter name between the production line device operation information and the production line device configuration information, and a parameter comparison with a same parameter name between the defective product testing device operation information and the defective product testing device configuration information again, generating check comparison consistent information or check comparison inconsistent information according to a comparison result, and feeding the check comparison consistent information or the check comparison inconsistent information back to the user platform for display;

after generating the check comparison inconsistent information, comparing, by the service platform, a count of defective products of a process whose the count of defective products exceeds the first count threshold of defective products set by the process with a second count threshold of defective products set by the process, wherein the second count threshold of defective products is larger than the first count threshold of defective products, determining the count of defective products of a process whose the count of defective products exceeds the first count threshold of defective products set by the process exceeds the second count threshold, in response to determining the count of defective products of a process whose the count of defective products exceeds the first count threshold of defective products set by the process exceeds the second count threshold; generating information on defective products exceeding a limit in the process and feeding the information on defective products exceeding the limit in the process back to the user platform for display; sending, by the user platform, a production line shutdown instruction input by a user to all object platforms associated with the production line through the service platform, the management platform, and the sensor network platform in turn; and receiving, by the object platforms, the production line shutdown instruction and stopping an operation.

3. The regulation method according to claim 2, wherein the service platform adopts a rear split platform arrangement, the rear split platform arrangement means that the service platform is provided with a general service platform and a plurality of service sub-platforms, each service sub-platform is in one-to-one correspondence to a corresponding object platform of the each process on the production line, control information and object platform parameter configuration information are transmitted from the service sub-platforms to the general service platform, and the perception information is transmitted from the general service platform to the service sub-platforms; including receiving, by the general service platform, the defective product testing information of the each process on the production line sent by the management platform, and sending defective product testing information of a corresponding object platform of the each process to a corresponding service sub-platform of the process; independently comparing, by each service sub-platform of the service platform, the count of defective products of the process with the first count threshold of defective products of the process, and independently generating the instruction for retrieving process information of the process when the count of defective products exceeds the first count threshold of defective products, and sending the instruction for retrieving process information to the management platform through the general service platform, sending, by the management platform, the pre-stored production line device configuration information and defective product testing device configuration information, and latest-stored production line device operation information and defective product testing device operation information of the process corresponding to the instruction for retrieving process information to the corresponding service sub-platform through the general service platform; and performing, by the corresponding service sub-platform, a parameter comparison with a same parameter name between the production line device configuration information and the production line device operation information and a parameter comparison with a same parameter name between the defective product testing device configuration information and the defective product testing device operation information;

the management platform adopting an independent arrangement, wherein the independent arrangement means that the management platform is provided with a plurality of management sub-platforms, and each management sub-platform corresponds to an object platform for data storage, data processing, or data transmission; and the each management sub-platform configured to receive and process the perception information, the instruction for retrieving process information, and the parameter configuration instruction of the corresponding object platform; and the sensor network platform adopting a centralized arrangement, wherein the centralized arrangement means that the sensor network platform receives data uniformly, processes data uniformly, and sends data uniformly; and information transmission between the management platform and object platforms corresponding to all processes on the production line being completed through the sensor network platform uniformly.

4. The regulation method according to claim 2, wherein the parameter comparison with the same parameter name between the production line device operation information and the production line device configuration information, and the parameter comparison with the same parameter name between the defective product testing device operation information with the defective product testing device configuration information performed by the service platform in step 5 are independent comparisons, including:

comparing, by the service platform, all parameter data with the same parameter name between the production line device operation information and the production line device configuration information, if the parameter data with the same parameter name is consistent, generating configuration data normal information of the production line device and feeding the configuration data normal information of the production line device back to the user platform for display; if the parameter data with the same parameter name is inconsistent, generating a parameter configuration instruction of a corresponding process of the production line device and sending the parameter configuration instruction to a corresponding object platform through the management platform and the sensor network platform in turn; after receiving the parameter configuration instruction and completing configuration on the production line device, transmitting, by the corresponding object platform, production line device operation information to the service platform through the sensor network and the management platform in turn; performing, by the service platform, a parameter comparison with a same parameter name between the production line device operation information and the production line device configuration information again and generating the check comparison consistent information or the check comparison inconsistent information of the production line device according to the comparison result and feeding the check comparison consistent information or the check comparison inconsistent information of the production line device back to the user platform for display; and comparing, by the service platform, all parameter data with the same parameter name between the defective product testing device operation information and the defective product testing device configuration information, if the parameter data with the same parameter name is consistent, generating configuration data normal information of the defective product testing device and feeding the configuration data normal information of the defective product testing device back to the user platform for display; if the parameter data with the same parameter name is inconsistent, generating a parameter configuration instruction of a corresponding process of the defective product testing device and sending the parameter configuration instruction to the corresponding object platform through the management platform and the sensor network platform in turn; after receiving the parameter configuration instruction and completing configuration on the defective product testing device, transmitting, by the corresponding object platform, defective product testing device operation information to the service platform through the sensor network platform and the management platform in turn; performing, by the service platform, a parameter comparison with a same parameter name between the defective product testing device operation information and the defective product testing device configuration information again, generating the check comparison consistent information or the check comparison inconsistent information according to the comparison result and feeding the check comparison consistent information or the check comparison inconsistent information of the defective product testing device back to the user platform for display.

5. The regulation method according to claim 2, further comprising:

for the each process on the production line, comparing, by the service platform, the count of defective products of the each process with the first count threshold of defective products and the second count threshold of defective products of the each process, respectively, when the count of defective products of the all processes on the production line is not greater than the second count threshold of defective products of the corresponding processes, and the count of defective products of a plurality of processes is greater than the first count threshold of defective products of the corresponding plurality of processes, calculating a count of processes that the count of defective products exceeds the first count threshold of defective products in the all processes on the production line, and then comparing the count of the processes with a count threshold of defective product processes on the production line preset by the production line, performing no processing when the count of the processes is less than or equal to the count threshold of defective product processes, or generating the information on defective products exceeding a limit on the production line when the count of the processes is greater than the count threshold of defective product processes and feeding the information on defective product processes exceeding a limit on the production line back to the user platform for display; sending, by the user platform, the production line shutdown instruction input by the user to all the object platforms associated with the production line through the service platform, the management platform, and the sensor network platform in turn; and receiving, by the object platforms, the production line shutdown instruction and stopping the operation.

* * * * *